United States Patent
Mansour et al.

(10) Patent No.: US 10,210,398 B2
(45) Date of Patent: Feb. 19, 2019

(54) METHODS AND SYSTEMS FOR PREDICTING FLOW OF CROWDS FROM LIMITED OBSERVATIONS

(71) Applicant: Mitsubishi Electric Research Laboratories, Inc., Cambridge, MA (US)

(72) Inventors: Hassan Mansour, Boston, MA (US); Mouhacine Benosman, Boston, MA (US); Vahan Huroyan, St. Paul, MN (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 107 days.

(21) Appl. No.: 15/404,296

(22) Filed: Jan. 12, 2017

(65) Prior Publication Data

US 2018/0197017 A1    Jul. 12, 2018

(51) Int. Cl.
G06K 9/00    (2006.01)
G06T 7/215   (2017.01)
G06K 9/62    (2006.01)

(52) U.S. Cl.
CPC ....... G06K 9/00778 (2013.01); G06K 9/6269 (2013.01); G06T 7/215 (2017.01);
(Continued)

(58) Field of Classification Search
CPC ........... G06K 9/00369; G06K 9/00778; G06K 9/00771; G06K 2209/27; G06K 9/00798;
(Continued)

(56) References Cited

U.S. PATENT DOCUMENTS 5,835,008 A * 11/1998 Colemere, Jr. ........ B60Q 1/441
                                                        340/439
8,358,806 B2    1/2013 Dong et al.
(Continued)

FOREIGN PATENT DOCUMENTS

CN    101325690    12/2008
CN    103235944     5/2013
(Continued)

OTHER PUBLICATIONS

Hughes,"A continuum theory for the flow of pedestrians," Transportation Research Part B: Methodological, vol. 36, Issue 6, pp. 507-535, Jul. 2002.
(Continued)

*Primary Examiner* — Aklilu Woldemariam
(74) *Attorney, Agent, or Firm* — Gene Vinokur; James McAleenan; Hironori Tsukamoto

(57) ABSTRACT

Systems and methods for determining flows by acquiring a video of the flows with a camera, wherein the flows are pedestrians in a scene. The video includes a set of frames, wherein motion vectors are extracted from each frame in the set, and a data matrix is constructed from the motion vectors in the set of frames. A low rank Koopman operator can be determined from the data matrix and a spectrum of the low rank Koopman operator can be analyzed to determine a set of Koopman modes. Then, the frames are segmented into independent flows according to a clustering of the Koopman modes.

18 Claims, 6 Drawing Sheets

(52) U.S. Cl.
CPC ............... *G06T 2207/10016* (2013.01); *G06T 2207/20081* (2013.01); *G06T 2207/30241* (2013.01)

(58) Field of Classification Search
CPC ....... G06K 9/00805; G06K 2009/3291; G06K 9/00785; G06K 9/6296; G06K 9/6269; G06T 2207/10016; G06T 2207/30232; G06T 7/20; G06T 2207/30241; G06T 2207/20076; G06T 2207/30236; G06T 2207/20081; G06T 7/215; H04N 19/48; H04N 19/543; H04N 19/61; H04N 13/0242; B60R 21/34; G01S 5/0263; G01S 5/16; G07C 9/00; G08B 13/19608; H04W 4/02; H04W 4/38; G08G 1/095; G08G 1/0104; G08G 1/0145; G08G 1/07; G08G 1/0116; G08G 1/0133; G08G 1/0141; G08G 1/017; G08G 1/0962; G08G 1/096716; G08G 1/096725; G08G 1/096758; G08G 1/096783; B01L 3/502715; B01L 2200/0636; B01L 2300/0636; B01L 2300/0816; B01L 2300/0867; B01L 2300/0877; B01L 2300/163; B01L 2400/084; B01L 3/502776; B01L 2200/027; B01L 2200/0652; B01L 2200/10; C12Q 1/26; G06F 19/704; G06F 19/707; G06F 19/24; B01J 2219/0054; B01J 2219/00702; G01N 2800/52
USPC ........ 382/103, 173, 218; 348/144, 152, 155, 348/135, 143, 159; 340/439, 576
See application file for complete search history.

(56) References Cited

U.S. PATENT DOCUMENTS

| | | | |
|---|---|---|---|
| 8,773,536 B1 | 7/2014 | Zhang | |
| 2003/0014379 A1* | 1/2003 | Saias | G06Q 10/06 706/45 |
| 2003/0053658 A1* | 3/2003 | Pavlidis | G06K 9/00335 382/103 |
| 2003/0115030 A1* | 6/2003 | Ewing | C12Q 1/26 703/11 |
| 2006/0222205 A1* | 10/2006 | Porikli | G06K 9/32 382/103 |
| 2007/0223785 A1* | 9/2007 | Sano | G06K 9/00362 382/103 |
| 2008/0199050 A1* | 8/2008 | Koitabashi | B60R 1/00 382/107 |
| 2010/0166259 A1* | 7/2010 | Otsu | G06K 9/00771 382/103 |
| 2011/0200230 A1* | 8/2011 | Luke | G06K 9/00791 382/103 |
| 2011/0205359 A1* | 8/2011 | Lee | G08B 13/19608 348/143 |
| 2013/0128034 A1* | 5/2013 | Carr | G06K 9/00771 348/135 |
| 2013/0148848 A1* | 6/2013 | Lee | G06K 9/00771 382/103 |
| 2014/0195138 A1* | 7/2014 | Stelzig | G08G 1/0116 701/119 |
| 2014/0313339 A1* | 10/2014 | Diessner | H04N 7/18 348/148 |
| 2015/0073687 A1* | 3/2015 | Hampapur | G08G 1/07 701/117 |
| 2015/0281655 A1* | 10/2015 | Turetken | H04N 7/181 348/159 |
| 2017/0140546 A1* | 5/2017 | Mansour | G06K 9/00765 |

FOREIGN PATENT DOCUMENTS

| | | |
|---|---|---|
| KR | 101346773 | 12/2011 |
| WO | 2005114555 | 1/2005 |

OTHER PUBLICATIONS

Greenshields, "A study of Traffic Capacity," High Research Bord Proceedings 14, pp. 448-477, 1935.

Koopman, "Hamiltonian systems and transformations in Hilbert space," Proceedings of the National Academy of Sciences of the USA, 17, pp. 315-318, 1931.

Davidich et al. "Predicting Pedestrian Flow: A Methodology and a Proof of Concept Based on Real Life Data." PLOS One, www.plosone.org. Dec. 2013. vol. 8, Issue 12.

* cited by examiner

METHODS AND SYSTEMS FOR PREDICTING FLOW OF CROWDS FROM LIMITED OBSERVATIONS

FIELD

The present disclosure relates to methods and systems for crowd prediction, and more particularly to segmentation and identification using dynamical system analysis.

BACKGROUND

Dynamic flow completion from limited observation data is a common problem that arises in many fields such as crowd flow estimation, air flow sensing, and weather and ocean current prediction.

For example, regarding crowd flow estimation, the segmentation of motion flows within dense crowds of pedestrians in videos is an essential tool in crowd safety and crowd control applications. Videos of crowded scenes can exhibit complex crowd behaviors even under normal situations. For example, crowd flows in large congested areas, such as train stations, can initially appear chaotic. However, is often the case that low dimensional dynamical structures exist in the flow that is desirable to identify and segment from unstructured flows. Moreover, the automatic segmentation of independent crowd flows aids in the monitoring and prediction of hazardous situations in crowded environments.

Of particular interest is the detection and estimation of crowd flows using motion information extracted from the videos. Motion vectors can be determined using optical flow estimation applied to texture, that is pixel intensities, in videos, or the motion vectors can be extracted directly from a bitstream. The bitstream can encoded using any of the well known coding standards, e.g., MPEG, H.264, HEVC, etc.

Considering pedestrians in a crowded scene as particles in a flow, the motion vectors of a video frame correspond to observations of the velocities of particles at a time instance in the flow. Processing motion vectors, instead of the video texture, protects the privacy of individuals observed in surveillance videos.

U.S. Pat. No. 8,773,536 discloses a method for detecting independent motion in a surveillance video. The method constructs a linear system from macroblocks of the video by comparing texture gradients with motion vector. Independent flows are detected when the motion is flagged as a statistical outlier relative to the linear system.

Macroscopic Model for Pedestrian Flows

The macroscopic model for crowd flow considers the crowd as a flowing continuum and describes the average behavior of pedestrians. The model parameters are the density of the crowd $\rho$, and the horizontal and vertical velocities $(u,v)$ at each point in the grid $\Omega$. Macroscopic models for crowd flow are similar to models of fluid dynamics and are governed by the following hypotheses: (1) the speed of pedestrians at each point is determined only by the density of the crowd around that point; (2) Pedestrians have a common goal (potential); (3) Pedestrians want to minimize the estimated travel time, simultaneously avoiding the large density areas.

These hypotheses can be translated into the following PDE $$\begin{cases} \partial_t \rho + \partial_x (\rho u) + \partial_y (\rho v) = 0, \\ \rho \partial_t u + \rho(u\partial_x u + v\partial_y u) + K^2 \partial_x \rho v_{x_0} = \rho A_1[\rho, \vec{v}], \\ \rho \partial_t v + \rho(u\partial_x v + v\partial_y v) + K^2 \partial_y \rho v_{y_0} = \rho A_2[\rho, \vec{v}], \end{cases} \quad (1)$$

where $\rho(x,y)$ is the density, $u(x,y)$ is the horizontal velocity, $v(x,y)$ are respectively the horizontal and vertical velocities at all point $(x,y) \in \Omega$, and $$A_1[\rho, \vec{v}] = \alpha \hat{u}(\rho)(x_0 - x),$$

$$A_2[\rho, \vec{v}] = \alpha \hat{v}(\rho)(y_0 - y)$$

encode the goal of the pedestrians with $(x_0, y_0)$ being the target position and $(x,y)$ the current positions. $\alpha$ and $K$ are model parameters. The functions $\hat{u}(\rho) = u_o(1 - \rho/\rho_o)$ and $\hat{v}(\rho) = v_o(1 - \rho/\rho_o)$ obey the Greenshield's model which couples the magnitude of the velocity to the density. This allows to drive the dynamical system using either the velocity or the density alone.

Koopman and Dynamic Mode Decomposition

The Koopman Operator

Let $(M,n,F)$ be a discrete time dynamical system, where $M \subseteq R^N$ is the state space, $n \in Z$ is the time parameter and $F: M \to M$ is the system evolution operator. The Koopman operator $K$ is defined on the space of functions $F$, where $F = \{\phi | \phi: M \to C\}$, as follows:

$$K\phi = \phi \circ F. \quad (2)$$

The Koopman operator is linear and infinite dimensional, and it admits eigenvalues and eigenfunctions. For vector valued observables $g: M \to R^{Nis\ o}$, the Koopman operator also admits Koopman modes. The Koopman operator specifies a new discrete time dynamical system on the function space $(F,n,K)$. Let $\varphi_k(x)$, $1 \le k \le K$ be the top $K$ eigenfunctions of $K$. Without loss of generality, let the system variable be $x \in M$ and assume that the function $g(x) = x$. Then, shows that $$g(x) = x = \sum_{k=1}^{K} \xi_k \varphi_k(x)$$

and the future state $F(x)$ can be estimated as $$F(x) = (Kg)(x) = \sum_{k=1}^{K} \xi_k (K\varphi_k)(x) = \sum_{k=1}^{K} \lambda_k \xi_k \varphi_k(x), \quad (3)$$

where $\xi_k$ and $\lambda_k$ are the Koopman modes and Koopman eigenvalues.

Kernel Dynamic Mode Decomposition

Williams et al. proposed the Kernel DMD (KDMD) algorithm as a low complexity method for approximating the Koopman operator. Let $f: M \times M \to R$ be a kernel function, and define the following data matrices $$\hat{G}_{ij} = f(x_i, x_j), \hat{A}_{ij} = f(y_j, x_i), \quad (4)$$

where $x_i$ and $y_j$ are column vectors of the data sets $X$ and $Y$. A rank-r truncated singular value decomposition of the symmetric matrix $\hat{G}$ results in the singular vector matrix $Q$ and the singular value matrix $\Sigma$. The KDMD operator $\hat{K}$ is then computed using $$\hat{K} = (\Sigma^\dagger Q^T)\hat{A}(Q\Sigma^\dagger). \quad (5)$$

An eigenvalue decomposition of $\hat{K}$ results in the eigenvector matrix $\hat{V}$ and eigenvalue matrix $\Lambda$. It was shown in that $\Lambda$ approximates the Koopman eigenvalues. Moreover, the Koopman eigenfunctions are approximated by the matrix $\Phi = V^T \Sigma^T Q^T$. Since every data point $x_i = \Sigma_k \lambda_k \xi_k \varphi_k$, the Koopman modes are approximated by the matrix $\Xi = X\Phi^\dagger = Q\Sigma \hat{V}^\dagger$, where $X = [x_1 \ldots x_T]$.

For every new data point x*, the corresponding prediction y*≈F(x*) can be approximated using KDMD by first estimating the eigenfunction $$(x^*) = \Phi[f(x^*, x_1), f(x^*, x_2), \ldots, f(x^*, x_T)]^T, \quad (6)$$

and using the Koopman prediction relation $$\begin{cases} x^* \approx \Xi(x^*), \\ y^* \approx \Xi \Lambda(x^*). \end{cases} \quad (7)$$

Accordingly, there is a need for a data anonymization method that can minimize or avoid the usage of the actual state of the device producing the data.

SUMMARY

Embodiments of the present disclosure provide for systems and methods in the field of crowd prediction, segmentation and identification using dynamical system analysis.

The present disclosure provides for predicting and completing the flows of crowds in a large scene from limited spatial observations in regions of the scene. For a particular scene, the systems and methods first obtain training velocity data of example crowds flowing through a desired scene. The training data may be obtained through surveillance video observations of a complete scene or through computer simulations of flows within the scene.

The training data can then be used to learn a kernel dynamic mode decomposition (KDMD) operator that captures the dynamics experienced in the scene. For every new flow observed in the spatially limited region, the flow completion problem is cast as a least squares inverse problem constrained by the prediction of the KDMD operator. A basis representation can be determined from the KDMD operator, and flow completion can be achieved by estimating the coefficients of the basis expansion of the observed flow. The coefficients can finally be used to reconstruct the complete flow by a projection onto the KDMD bases.

In other words, we are able to overcome the problem of estimating temporally evolving flow parameters on a spatial grid or scene that is not fully observed. For example, the present disclosure can provide for reconstructing the complete flow of the scene with limited observations by a limited number of sensors that do not cover the entire scene or entire grid. In fact, the present disclosure is able to provide accurate representations of the flow of a real crowd of pestestrians inexpensively, efficiently and quickly, since the training stage allows for calculations to be carried out at other times or offline.

In an embodiment of the present disclosure determines states of flow of objects in a scene. Wherein at least one sensor can be used to measure the states of the flow at observed sample points of the scene. The scene contains a set of sample points having subsets of observed and unobserved sample points. A memory to a computer can be used to store an operator specifying time-varying dynamics of training states of flow of the objects in the scene. Further, the operator can be trained to determine an estimated future state of the states of flow of the objects at a sample point in the scene, as a function of current measured states of the states of flow of the objects at the set of sample points in the scene. A processor in communication with the memory, can be configured to estimate, using the operator and the measured states at the subset of observed sample points, the states of the flow of the objects at the subset of unobserved sample points of the scene. Such that the estimated future states at the subset of observed sample points are consistent with the measured states at the subset of observed sample points. Finally, an output interface in communication with the processor, can be configured for outputting the states of the flow at the set of unobserved sample points of the scene.

The present disclosure is based on the realization that we don't need to do flow estimation for a generic scene. The scene can be known in advance and characteristics of the scene can be studied to learn its dynamics offline.

For example, in using training data of the complete exemplar flow of the objects in the scene, it is possible to learn the dynamics that are exhibited in the scene. The training data may be obtained from an initial data collection stage before system deployment or from previous flow simulations driven by flow models, such as pedestrian flow models. Essentially, the previous flow models or any other data related to assisting with the determination of the states of the flow at the set of unobserved sample points of the scene, can be accessed via stored historical data from memory.

We further realized through the development of our concept an operator that captures the scene dynamics can be learned from the fully observed training data. Specifically, the trained operator determines a future state of the flow of the objects at a point in the scene as a function of current states of the flow at all points in the scene.

Thus, based on our realizations, we further realized that when estimating, using the operator and the states of flow of objects measured for the observable points in the scene, that the states of the flow at the observable and unobservable points of the scene, are such that, the estimated states at the observable points are consistent with the measured states at the observable points.

For example, given a spatial scene with predefined boundary conditions, training data may be generated by simulating multiple flow regimes with different initial conditions. Specifically, when real video surveillance data are available that cover all the spatial scene, the flow information can be extracted by computing video motion vectors. We know that the motion vectors of a single video frame correspond to observations of the velocities of particles at a time instance in the flow. The motion vectors can be computed using optical flow estimation applied to the video texture, or they can be parsed directly from the compressed domain of encoded video bitstreams.

The present disclosure can be implemented using a processor, by non-limiting example, beginning with the step of acquiring measured states of the flow at observed sample points of the scene generated by one or more sensor. Such that the scene can contain a set of sample points having subsets of observed and unobserved sample points.

The next step includes using a memory that has stored thereon, an operator specifying time-varying dynamics of training states of flow of the objects in the scene. The operator can be trained to determine an estimated future state of the states of flow of the objects at a sample point in the scene, as a function of current measured states of the states of flow of the objects at the set of sample points in the scene.

Follow by the next step of estimating, using the operator and the measured states at the subset of observed sample points, the states of the flow of the objects at the subset of unobserved sample points of the scene. Such that the estimated future states at the subset of observed sample points are consistent with the measured states at the subset of observed sample points.

Finally, the last step includes outputting, via an output interface in communication with a processor, the states of the flow at the set of unobserved sample points of the scene, so as to assist in a management of managing states of flow of objects in the scene.

According to an embodiment of the present disclosure, a system for determining states of flow of objects in a scene. The system comprising at least one sensor to measure the states of the flow at observed sample points of the scene, wherein the scene contains a set of sample points having subsets of observed and unobserved sample points. A memory to store an operator specifying time-varying dynamics of training states of flow of the objects in the scene. Wherein the operator is trained to determine an estimated future state of the states of flow of the objects at a sample point in the scene, as a function of current measured states of the states of flow of the objects at the set of sample points in the scene. A processor in communication with the memory, configured to estimate, using the operator and the measured states at the subset of observed sample points, the states of the flow of the objects at the subset of unobserved sample points of the scene. Such that the estimated future states at the subset of observed sample points are consistent with the measured states at the subset of observed sample points. Finally, an output interface in communication with the processor, is configured for outputting the states of the flow at the set of unobserved sample points of the scene, so as to assist in a management of managing states of flow of objects in the scene.

According to an embodiment of the present disclosure, a method for determining states of flow of objects in a scene. The method comprising acquiring measured states of the flow at observed sample points of the scene generated by at least one sensor. Wherein the scene contains a set of sample points having subsets of observed and unobserved sample points. Using a memory having stored thereon an operator specifying time-varying dynamics of training states of flow of the objects in the scene. Wherein the operator is trained to determine an estimated future state of the states of flow of the objects at a sample point in the scene, as a function of current measured states of the states of flow of the objects at the set of sample points in the scene. Estimating, by a processor in communication with the memory, and using the operator and the measured states at the subset of observed sample points, the states of the flow of the objects at the subset of unobserved sample points of the scene. Such that the estimated future states at the subset of observed sample points are consistent with the measured states at the subset of observed sample points. Finally, outputting, via an output interface in communication with the processor, the states of the flow at the set of unobserved sample points of the scene, so as to assist in a management of managing states of flow of objects in the scene.

According to another embodiment of the present disclosure, a non-transitory computer readable storage medium embodied thereon a program executable by a computer for performing a method. The method comprising acquiring measured states of the flow at observed sample points of the scene generated by at least one sensor. Wherein the scene contains a set of sample points having subsets of observed and unobserved sample points. Using a memory having stored thereon an operator specifying time-varying dynamics of training states of flow of the objects in the scene. Wherein the operator is trained to determine an estimated future state of the states of flow of the objects at a sample point in the scene, as a function of current measured states of the states of flow of the objects at the set of sample points in the scene. Estimating, by a processor in communication with the memory, and using the operator and the measured states at the subset of observed sample points, the states of the flow of the objects at the subset of unobserved sample points of the scene. Such that the estimated future states at the subset of observed sample points are consistent with the measured states at the subset of observed sample points. Finally, outputting, via an output interface in communication with the processor, the states of the flow at the set of unobserved sample points of the scene, so as to assist in a management of managing states of flow of objects in the scene.

Further features and advantages will become more readily apparent from the following detailed description when taken in conjunction with the accompanying drawings.

DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

Figure 1A:
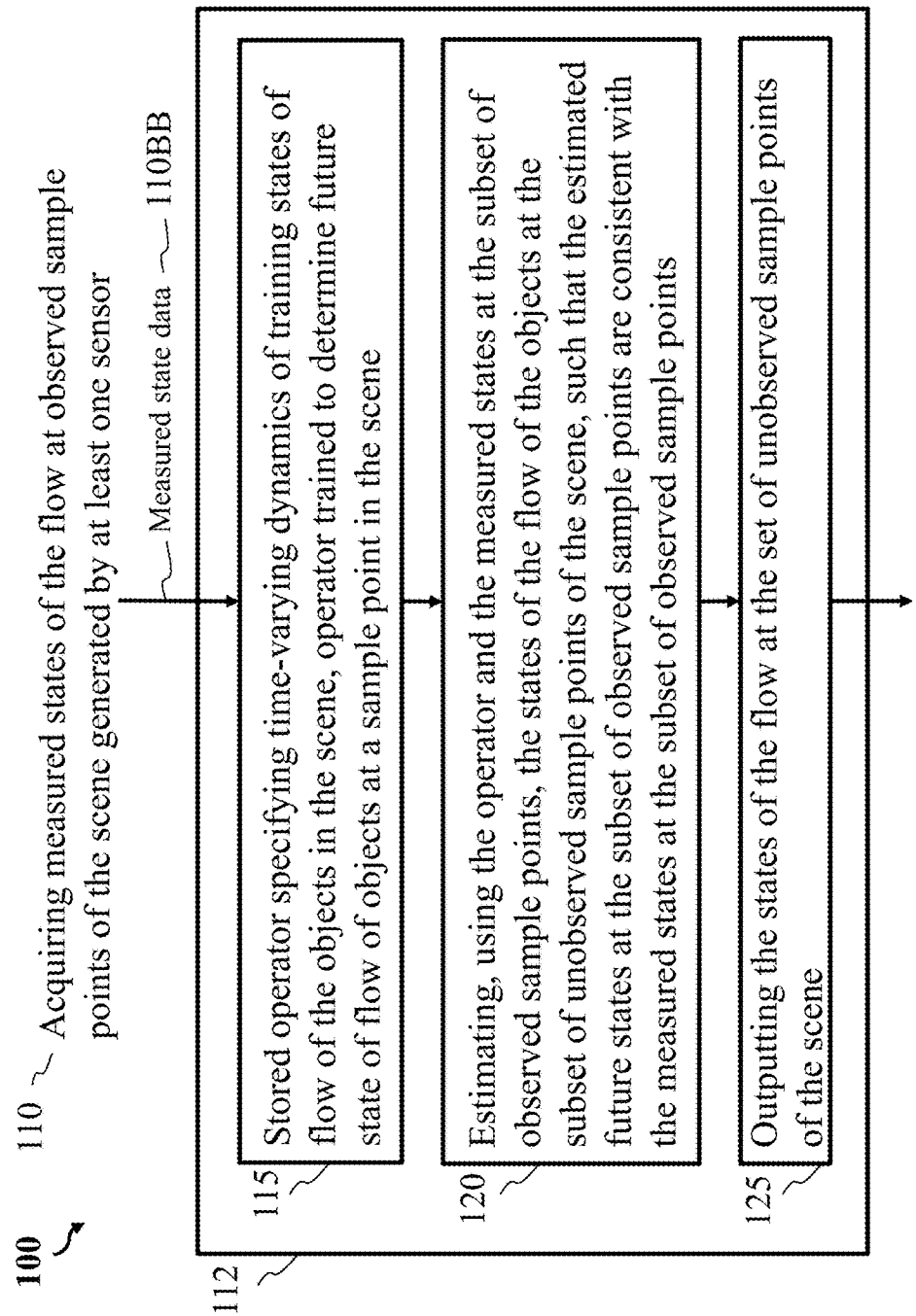
FIG. 1A is a block diagram illustrating at least one method for determining states of flow of objects in a scene having limited observations, according to embodiments of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims. Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Overview

Embodiments of the present disclosure provide for systems and methods for predicting and completing the flows of objects in a large scene $\Omega$ from limited spatial observations in regions $\Gamma$ of the scene. The objects can include one or a combination of an animal, a machine, a fluid, a material or an electrical current.

For a particular scene $\Omega$, the methods and systems first obtain training velocity data of example objects, flowing through the desired scene. The training data may be obtained through surveillance video observations of the complete scene or through computer simulations of the flows within the scene. Another approach to obtain training data may be through a panning camera that captures one subset of the scene at each instance of time. The observed subset of the scene changes over different time periods such that over a long duration of time, all subsets of the complete scene are observed at some time instance by the camera. The training data can then be used to learn a kernel dynamic mode decomposition (KDMD) operator that captures the dynamics experienced in the scene. For every new flow observed in the spatially limited region $\Gamma$, the flow completion problem can be cast as a least squares inverse problem constrained by the prediction of the KDMD operator. A basis representation is determined from the KDMD operator and flow completion can be achieved by estimating the coefficients of the basis expansion of the observed flow. The coefficients are finally used to reconstruct the complete flow by a projection onto the KDMD bases.

In an embodiment of the present disclosure, the system and method determine states of flow of objects in a scene from limited observation. One or more sensor may be used to measure the states of the flow at observed sample points of the scene. Wherein the scene contains a set of sample points that includes subsets of observed and unobserved sample points. Stored in a memory is an operator specifying time-varying dynamics of training states of flow of the objects in the scene. Wherein the operator can be trained to determine an estimated future state of the states of flow of the objects at a sample point in the scene, as a function of current measured states of the states of flow of the objects at the set of sample points in the scene. Then, it is possible to estimate, using the operator and the measured states at the subset of observed sample points, the states of the flow of the objects at the subset of unobserved sample points of the scene. Such that the estimated future states at the subset of observed sample points are consistent with the measured states at the subset of observed sample points. Finally, an output interface in communication with the processor, can be configured for outputting the states of the flow at the set of unobserved sample points of the scene.

We realized through experimentation that we don't need to do flow estimation for a generic scene. The generic scene can be known in advance and characteristic of the scene can be studied to learn its dynamics. For example, in using training data of the complete exemplar flow of the objects in the scene, it is possible to learn the dynamics that are exhibited in the scene. The training data may be obtained from an initial data collection stage before system deployment or from flow simulations driven by flow models, such as pedestrian flow models. For example, stored in memory can be historical data that includes the flow models and other data related with assisting in the determination of the states of the flow at the set of unobserved sample points of the scene.

We further realized through the development of the concept an operator that captures the scene dynamics can be learned from the fully observed training data. Specifically, the trained operator determines a future state of the flow of the objects at a point in the scene as a function of current states of the flow at all points in the scene. Thus, based on our realizations, we further learned that when estimating, using the operator and the states of flow of objects measured for the observable points in the scene, that the states of the flow at the observable and unobservable points of the scene, are such that, the estimated states at the observable points are consistent with the measured states at the observable points.

FIG. 1A is a block diagram of a method for determining states of flow of objects in a scene having limited observations, according to embodiments of the present disclosure. The method of the present disclosure can include step 110 acquiring measured states of the flow at observed sample points of the scene generated by at least one sensor. Wherein the scene contains a set of sample points having subsets of observed and unobserved sample points. The measured data 110BB generated from the one or more sensor can be received by a processor 112.

Referring to step 110, the measured data 110BB includes time-series data collected over a period of time from the sensor(s), such that each sensor senses data at a set of time points within the period of time correlating to sample points in the set of sample points. Contemplated is that the measured data 110BB may be received wireless or wired to a device in communication with a transceiver and stored in a computer readable memory. The measured data 110BB may also be collected via the processor 112 via real time data up to a delay of a segment length in time. It is possible the measured data 110BB can be collected via sensor(s) connected to the processor 112.

Step 115 of FIG. 1A includes using the memory to have stored thereon, an operator specifying time-varying dynamics of training states of flow of the objects in the scene. Specifically, the operator may be selected from a group consisting of a Koopman operator, a dynamic mode decomposition operator, an extended dynamic mode decomposition operator and a kernel dynamic mode decomposition operator. Wherein operator is trained to determine an estimated future state of the states of flow of the objects at a sample point in the scene, as a function of current measured states of the states of flow of the objects at the set of sample points in the scene. The choice of operator may be selected according to the complexity of the dynamics of the flow of objects in the scene.

In other words, our goal is to estimate from the observed observations or partial observations and using an approximated Koopman modes, eigenvalues and eigenfunctions, to determine the unobservered observations from the set of sample points in the scene. Given current estimates of the states of the entire set of sample points in the scene and using the approximated Koopman modes, eigenvalues and eigenfunctions, then upon completing step 115 we will have determined future sample points for the entire set of sample points of the scene.

Still referring to step 115 of FIG. 1A, the training of the operator may include one or a combination of: (1) obtaining historical data of training states of the flow of objects in the set of sample points in the scene; (2) simulating according to a model, the training states of the flow of objects in the set of sample points in the scene; or (3) obtaining the training states of the flow of objects in a series of subsets of sample points in the scene. Wherein at least one subset of the sample points in the series of subsets of sample points, are observed sample points at a time that is different than observable sample points times for the remaining subsets of the sample points in the series of subsets of sample points in the scene. Such that all the subsets of the sample points in the series of sample points in the scene include all the sample points in the set of sample points in the scene.

Figure 1B:
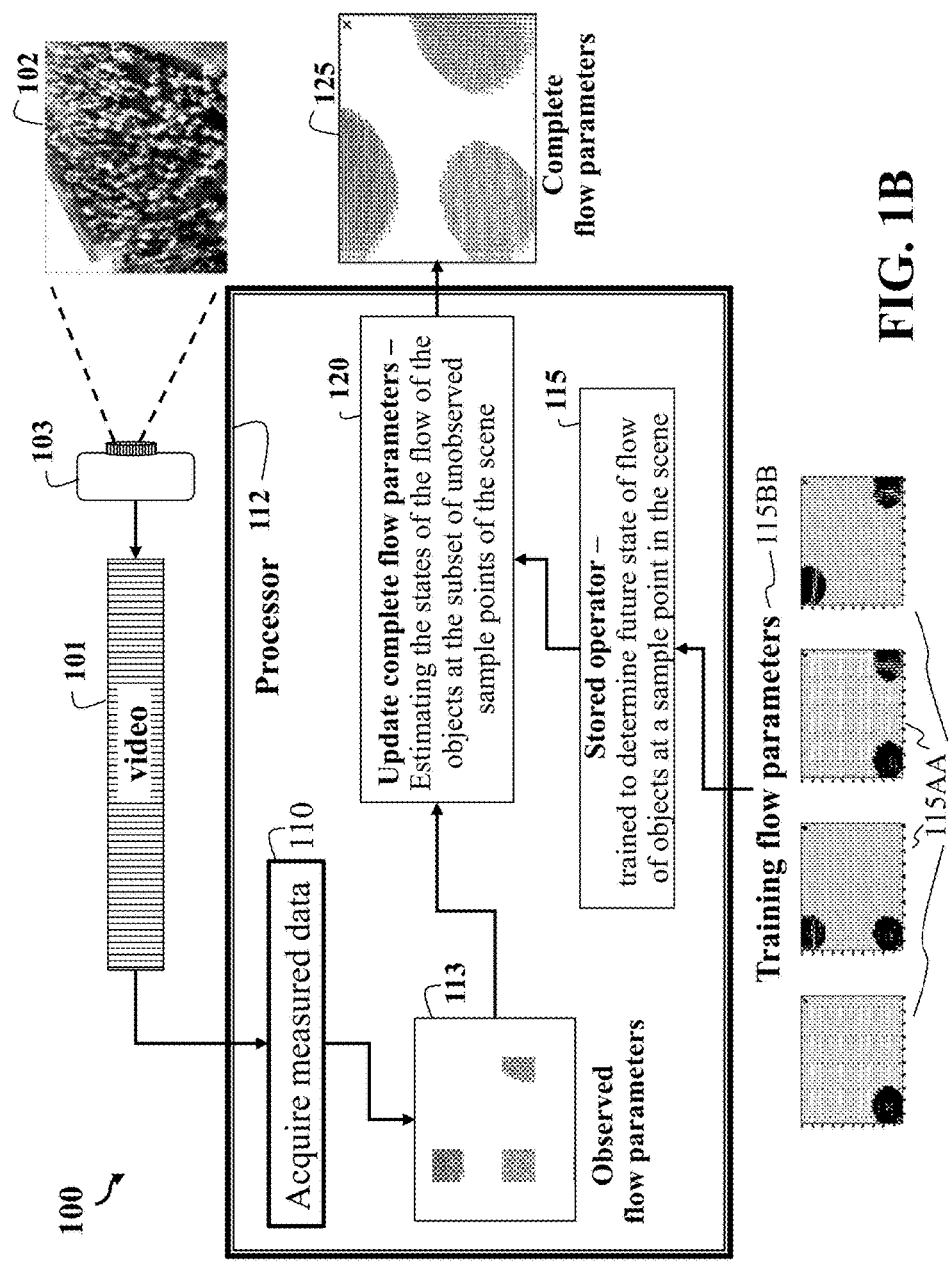
FIG. 1B is a schematic illustrating the system and method of FIG. 1A, for estimating complete object flows in a video acquired of a scene, according to embodiments of the present disclosure.

FIG. 1B is a schematic of a system and method for segmenting object flows in a video acquired of a scene, according to embodiments of the present disclosure. Step 115 can include historical data of training states of the flow of objects in the set of sample points in the scene, for example, training flow parameters 115BB, which are further expressed as graphs 115AA. The training flow parameters can include a density of the crowd of a generic scene, horizontal and vertical velocities at each point in the generic grid/scene, and flow-rate estimates of the crowd of a generic scene.

Referring to FIG. 1B and FIG. 1A, FIG. 1B further illustrates the sensor 103 can be a camera capturing video 101 of the flows of objects 102, and the flow of objects, for example, may be pedestrians in the scene 102. Such that the video 101 includes a set of frames, wherein the flows are independent pedestrian flows obtained from each frame in the set of frames in the subset of the observed sample points of the scene 102, and the subset of the observed sample points of the scene 102 are selected from a group consisting of a set of velocity vectors, a set of crowd densities, a set of optical flow vectors or a set of motion vectors.

Still referring to step 115 of FIG. 1A and FIG. 1B, regarding the states of flow of the object, the object may include one or a combination of a density, a velocity or a flowrate. Further, the states of flow of the object can include one or a combination of an electrical current, a voltage, a power or a load. Further still, the states of flow of the object may include one or a combination of a temperature, a velocity or a density, depending upon the specific application.

Step 120 of FIG. 1A and FIG. 1B, estimating, by using the operator and the measured states at the subset of observed sample points, the states of the flow of the objects at the subset of unobserved sample points of the scene. Wherein the estimated future states at the subset of observed sample points are consistent with the measured states at the subset of observed sample points. Specifically, the measured states at the subset of observed sample points can include noise observations, such that the estimated future states at the subset of observed sample points are consistent or equal to the measured states less the noise observations at the subset of observed sample points.

Still referring to step 120 of FIG. 1A and FIG. 1B, the estimating of the states of the flow of the objects at the subset of unobserved sample points of the scene can include determining a set of coefficients for a set of basis matrices by minimizing an error between the set of observed sample points of the scene 102 by the sensors 103 and the estimated future states at the subset of observed sample points of the operator. Along with ensuring or confirming that the set of coefficients for the set of basis matrices conform to a temporal prediction condition according to a set of eigenvalues of the operator.

Step 125 includes outputting the states of the flow at the set of unobserved sample points of the scene.

The present disclosure is a framework for flow completion where training data defined over the complete scene $\Omega$ are available to learn a kernel DMD operator that captures the dynamics of flows in the scene. Then, for new test flows defined over a subset $\Gamma \subset \Omega$, we solve a least squares minimization problem constrained by the one step prediction of kernel DMD operator.

Figure 2:
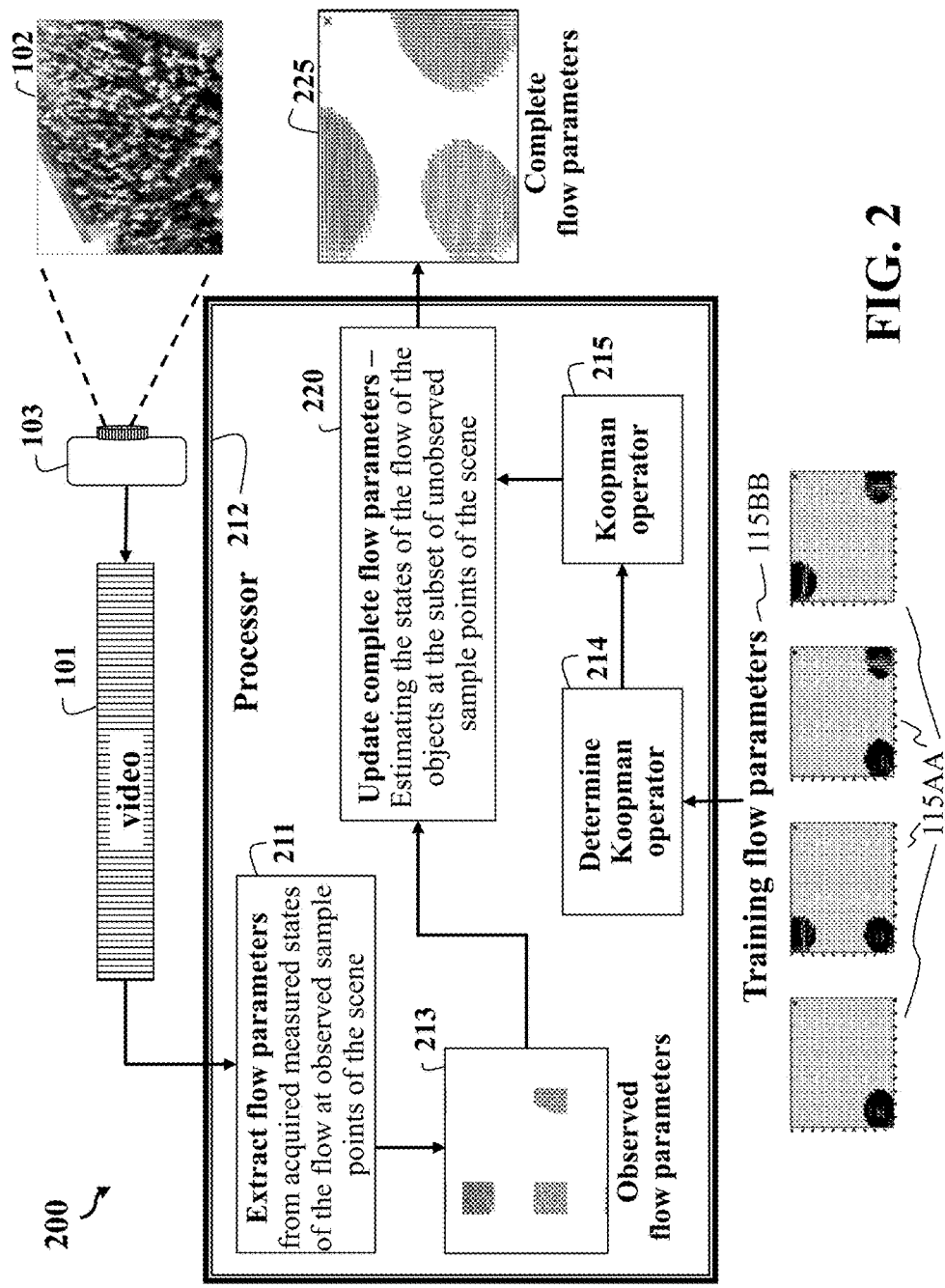
FIG. 2 is a schematic of illustrating a system and method for estimating complete object flows in a video acquired of a scene showing a Koopman operator, according to embodiments of the present disclosure.

FIG. 2 is a schematic of illustrating a method 200 for estimating complete object flows in a video 101 acquired of a scene 102 showing a Koopman operator 215, according to embodiments of the present disclosure. The sensor 103 maybe be a camera capturing video 101 of the flows of objects 102, i.e. measuring data, and the flow of objects, for example, may be pedestrians in the scene 102. The measuring data includes observable sample points in the set of sample points of the scene. Such that the observable sample points in step 211 are extracted from the measured data, as illustrated in the observed flow parameters 213. Training flow parameters 115BB are then used to determine the Koopman operator 214. The Koopman operator allows to update complete flow parameters 220 by estimating the state of the flow of objects at the subset of unobserved sample points in the scene. Finally, the complete flow parameters 225 are output.

Figure 3A:
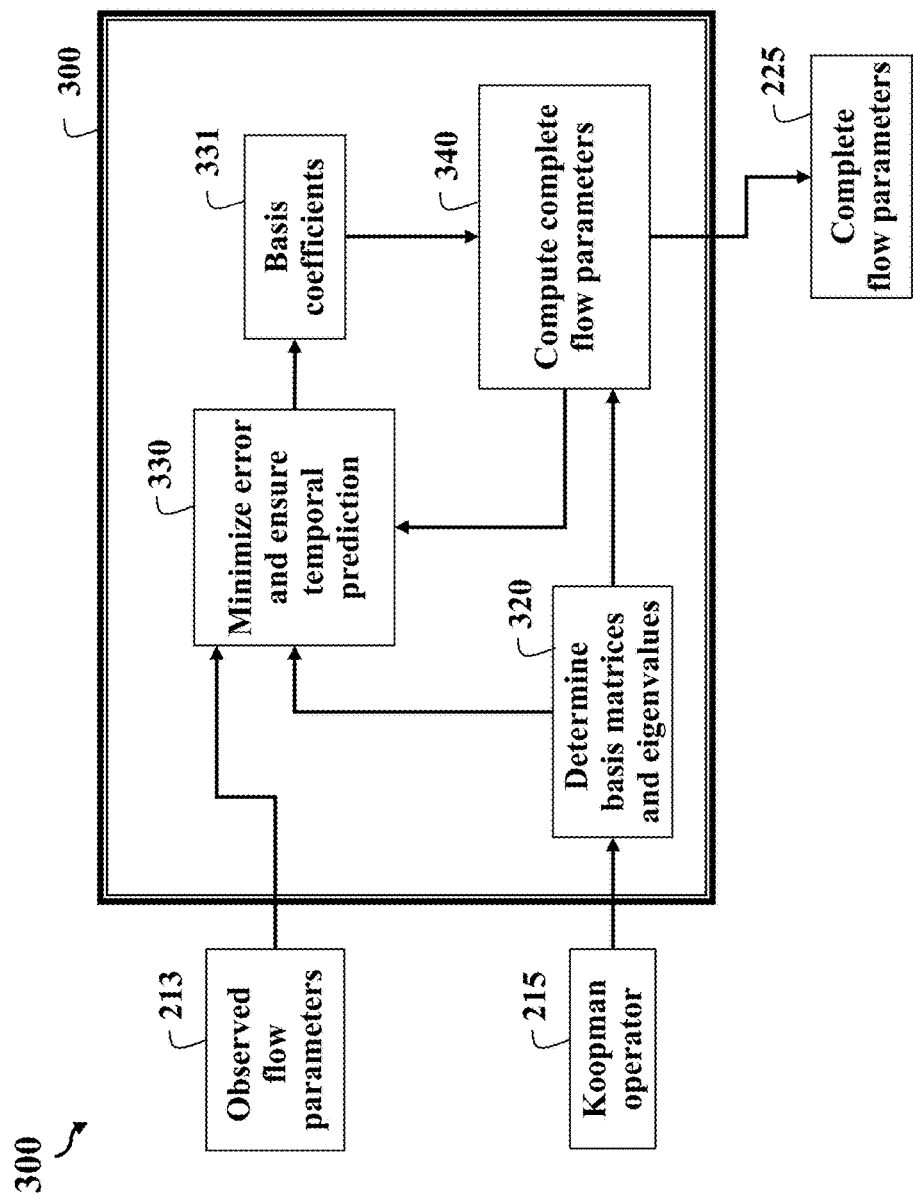
FIG. 3A is a flow diagram of a method for determining complete flow parameters by determining Koopman modes and eigenvalues, then estimating basis coefficients of the Koopman modes. The complete flow parameters can be determined by combining the estimated basis coefficients with the Koopman modes, according to embodiments of the present disclosure.

FIG. 3A is a flow diagram of a method for determining 300 complete flow parameters 225 by first determining Koopman modes and eigenvalues, followed by estimating basis coefficients of the Koopman modes. The stored Koopman operator 215 is used to determine basis matrices and eigenvalues 320 according to the kernel DMD method to produce matrices $\Xi$, $\Phi$, and $\Lambda$. Basis coefficients 331 are estimated by minimizing 330 an error between computed complete flow parameters 340 and the observed flow parameters 213.

The minimizing step 330 also ensures that temporal prediction rules of the Koopman operator are always satisfied.

Figure 3B:
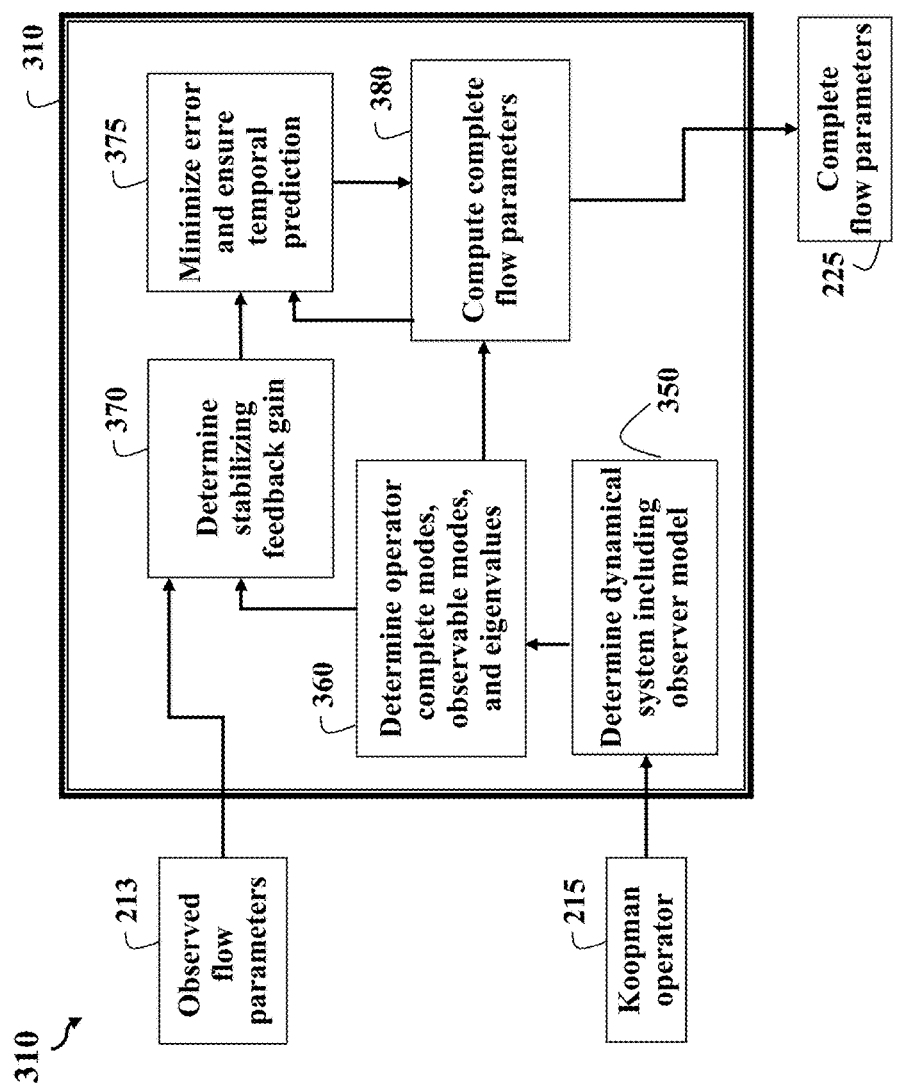
FIG. 3B is a flow diagram of another method for determining complete flow parameters using operator modes and eigenvalues. The method utilizes a dynamical system observer model to estimate a stabilizing feedback gain. The stabilizing feedback gain can be combined with the operator modes to determine complete flow parameters, according to embodiments of the present disclosure.

FIG. 3B is a flow diagram of another method for determining 310 complete flow parameters 225 using operator modes and eigenvalues. This method utilizes a dynamical system that includes an observer model 350 to determine complete modes, observable modes, and eigenvalues 360 of the operator.

Step 370 of FIG. 3B determines a stabilizing feedback gain that allows to compute complete flow parameters 380 by minimizing an error between the observed flow parameters 213 and the computed complete flow parameters 380.

The minimizing step 375 utilizes the stabilizing feedback gain 370 to ensure that the error between the observed flow parameters 213 and the computed complete flow parameters 380 is always decreasing.

Training Data Generation

Given a spatial scene $\Omega$ with predefined boundary conditions, training data may be generated by simulating multiple flow regimes with different initial conditions. When real video surveillance data are available that cover all of the spatial scene $\Omega$, flow information can be extracted by computing video motion vectors. The motion vectors of a single video frame correspond to observations of the velocities of particles at a time instance in the flow. Motion vectors can be computed using optical flow estimation applied to the video texture, or they can be parsed directly from the compressed domain of encoded video bitstreams.

In one embodiment of present disclosure and referring to FIG. 2, the macroscopic pedestrian flow model can be used to generate the training data or training flow parameters 115BB as viewed in graphs 115AA. We use a finite volume method to numerically solve a partial differential equation (PDE) that describes the flow of crowds in a predefined spatial scene. We run the model with L different initial conditions for T+1 time steps and collect the data as follows. For the l-th initial condition, $1 \leq l \leq L$, we first form the data matrix $Z^l \in R^{D \times (T+1)}$ by vertically stacking the horizontal and vertical velocities for each spatial grid point in $\Omega$, where the scene grid is of size $N_x \times N_y$ and $D = 2N_x N_y$. Let $Z^l = [z_1^l, \ldots, z_{T+1}^l]$ we rearrange the columns of $Z^l$ to construct current and future training data matrices $X_{tr}^l$ and $Y_{tr}^l$, such that $X_{tr}^l = [z_1^l, \ldots z_T^l]$, $Y_{tr}^l = [z_2^l, \ldots z_{T+1}^l]$. The data matrices associated with each of the L initial conditions are then stacked to form the total training data matrices $X_{tr} = [X_{tr}^1, \ldots, X_{tr}^N]$ and $Y_{tr} = [Y_{tr}^1, \ldots, Y_{tr}^N]$. The kernel DMD operator is then learned by computing the matrices $\Xi$, $\Phi$, and $\Lambda$.

For example, it is contemplated that the training of the operator may include one or a combination of: (1) obtaining historical data of training states of the flow of objects in the set of sample points in the scene; (2) simulating according to a model, the training states of the flow of objects in the set of sample points in the scene; or (3) obtaining the training states of the flow of objects in a series of subsets of sample points in the scene. Wherein at least one subset of the sample points in the series of subsets of sample points, are observed sample points at a time that is different than observable sample points times for the remaining subsets of the sample points in the series of subsets of sample points in the scene. Such that all the subsets of the sample points in the series of sample points in the scene include all the sample points in the set of sample points in the scene.

Still referring to FIG. 2, in another embodiment, video sequences capturing training flows from the complete scene $\Omega$ may be used to obtain the training data or training flow parameters 115BB as viewed in graphs 115AA. The video sequences are processed to extract optical flow motion vectors or encoder domain motion vectors to approximate the crowd velocities in the scene.

In yet another embodiment, panning cameras placed at appropriate positions in the complete scene $\Omega$ may be used to capture videos that record portions of the $\Omega$. The cameras may not be capable of capturing the complete scene $\Omega$ at one time. However, the panning of the cameras collectively cover all of $\Omega$ over the full panning period. In this situation, motion vectors are computed from the videos and placed in a matrix z. Due to the panning nature of the cameras, not all entries of the matrix z are observed. Therefore, robust low rank matrix completion methods may be used to first complete the matrix z to produce the matrix $\tilde{Z}$. The completed matrix $\tilde{Z}$ can then be used to compute the kernel DMD operator.

Once the training data and training flow parameters are obtained, current and future training data matrices $X_{tr}$ and $Y_{tr}$ are constructed as before. The training data matrices are used to determine 214 the Koopman operator 215 and compute the basis matrices $\Xi$, $\Phi$, and eigenvalues $\Lambda$ 320 in FIG. 3A. The training data matrices are also used to determine the complete modes, observable modes, and eigenvalues 360 in FIG. 3B.

Flow Completion

Regarding flow completion 300, suppose that we observe the velocities of a new flow $X^* = \{x^*_1, \ldots, x^*_{T'}\} \in R^D$ on the region $\Gamma$. Denote by $O = \{o_1, \ldots, o_{T'}\} \subset R^d$, $d < D$ the sequence of observed velocities over T snapshots in time. Also denote by $M: R^D \to R^d$ be a masking operator that maps from $\Omega$ to $\Gamma$. We represent the masking operator by the $d \times D$ matrix with the same name M. Then $\forall 1 \leq t \leq T'$, $o_t = Mx^*_t$. Our goal is to estimate $x^*_t$ from the partial observations $o_t$ and using the approximated Koopman modes, eigenvalues and eigenfunctions as shown in (7).

Still referring to FIG. 3A, since the vectors $x^*_t$ are not available to evaluate the kernel functions $f(x^*_t, x_j)$, $\forall j \in \{1 \ldots (T+1)L\}$, we model $x^*_t$ as $$\begin{cases} x_t^* = \Xi \Phi a_t, \\ x_{t+1}^* = \Xi \Lambda \Phi a_t \end{cases} \tag{8}$$

where $a_t$ are the coefficients of the basis expansion of $x^*_t$ in $\Xi \Phi$. Hence, the flow completion problem becomes that of estimating the coefficient matrix $A = [a_1 \ldots a_{T'}]$ from the observations O.

Method 1

The coefficient matrix A essentially approximates the kernel function evaluations $f(x^*_t, x_j)$, $\forall j \in \{1 \ldots (T+1)L\}$, which enables us to determine the complete flow parameters 225. In order to compute A, we need exploit additional structure otherwise it is not possible to find a unique solution. To that end, we observed that these kernel evaluations are generally smooth over time, i.e., $\|a_t - a_{t+1}\|$ is small, when $o_1, o_2, \ldots, o_{T'}$ are consecutive temporal observations. This is especially true when the eigenvalues of the KDMD operator are close to the unit circle. Motivated by this observation and using (8), we cast the flow recovery problem as follows $$\min_{A} \left\| \begin{bmatrix} OE_1 \\ OE_2 \end{bmatrix} - \begin{bmatrix} M\Xi\Phi \\ M\Xi\Lambda\Phi \end{bmatrix} A \right\|_F^2 + \frac{\gamma}{2} \|AE_2 - AE_1\|_F^2, \quad (9)$$

where $E_1$ and $E_2$ are restriction operators that select columns 1 to T'−1 and 2 to T' of A, respectively, and $\gamma$ is a regularization parameter. The above formulation allows us to compute a unique A that enables us to determine the complete flow parameters.

In order to solve (9), we develop a solver based on the alternating direction method of multipliers (ADMM). The augmented Lagrangian of (9) is given by $$\min_{A_1, A_2} \left\| \begin{bmatrix} OE_1 \\ OE_2 \end{bmatrix} - \begin{bmatrix} M\Xi\Phi \\ M\Xi\Lambda\Phi \end{bmatrix} A_1 \right\|_F^2 + \frac{\gamma}{2} \|A_2(E_2 - E_1)\|_F^2 + \frac{\mu}{2} \left\| A_1 - A_2 + \frac{W}{\mu} \right\|_F^2. \quad (10)$$

For the ease of notation, we denote by $$\hat{O} = \begin{bmatrix} OE_1 \\ OE_2 \end{bmatrix}, \quad \text{by } D = E_2 - E_1$$

the finite difference operator, and by $$B = \begin{bmatrix} M\Xi\Phi \\ M\Xi\Lambda\Phi \end{bmatrix}$$

and rewrite (10) as $$\min_{A_1, A_2} \|\hat{O} - BA_1\|_F^2 + \frac{\gamma}{2} \|A_2 D\|_F^2 + \frac{\mu}{2} \left\| A_1 - A_2 + \frac{W}{\mu} \right\|_F^2 \quad (11)$$

The ADMM algorithm for (11) is shown in Algorithm 1.

---
ALGORITHM 1 - FLOW COMPLETION
---

Input $\hat{O}$, $\Xi$, $\Lambda$, $\Phi$, $\gamma = 1$, $c > 1$ and maxiter
Output A
Initialize $W = 0$, $\mu = 10^{-8}$, $A_2$ for $i = 0$ to maxiter do
$A_1 = (B^TB + \mu I)^{-1}(B^T\hat{O} + \mu A_2 - W)$
$A_2 = (\mu A_1 + W)(\gamma DD^T + \mu I)^{-1}$
$W = W + \mu(A_1 - A_2)$
$\mu = c\mu$,
end for
$A = A_1$

---

Method 2

When the eigenvalues of the KDMD operator are not close to the unit circle, the temporal smoothness regularization of method 1 will no longer be correct. In order to correctly capture transient behavior and rely less on the temporal smoothness of A, we consider instead the temporal consistency of the coefficients in the context of Koopman prediction. More precisely, notice from (8) that $$x^*_{t+1} = \Xi\Lambda\Phi a_t = \Xi\Phi a_{t+1}. \quad (12)$$

Hence, the temporal consistency relation $$\Xi\Lambda\Phi AE_1 = \Xi\Phi AE_2 \quad (13)$$

should be imposed in the reconstruction. Notice that when the eigenvalues in A are all 1, condition (13) reduces to the smoothness assumption of Method 1.

Recall that the Koopman modes matrix $\Xi$ is of size D×r, where r is the truncated SVD rank of $\hat{G}$ in (4) which is generally chosen to be smaller than D. Therefore, $\Xi$ has no nullspace so we drop it from (13) and formulate the flow completion problem as follows $$\min_{A} \|\hat{O} - BA\|_F^2 + \frac{\gamma}{2} \|\Phi AE_2 - \Lambda\Phi AE_1\|_F^2, \quad (14)$$

for which we form the augmented Lagrangian and develop the corresponding ADMM solver shown in Algorithm 2.

---
ALGORITHM 2 - Flow Completion
---

Input $\hat{O} = [o_1 \, \overline{O} \, o_T]$, $\Xi$, $\Lambda$, $\Phi$, $\gamma = 1$, $c > 1$ and maxiter
Output A
Initialize $W_1 = [\overline{W}_1 \, w_{1,T}] = 0$, $W_2 = [w_{2,1} \, \overline{W}_2] = 0$, $\mu_1 = 10^{-8}$, $\mu_2 = 10^{-8}$,
$A_1 = [\overline{A}_1 \, a_{1,T}]$, $A_2 = [a_{2,1} \, \overline{A}_2]$
for $i = 0$ to maxiter do
$\overline{A} = (B^TB + (\mu_1 + \mu_2)I)^{-1}$
  $\times (B^T\overline{O} + \mu_1\overline{A}_2 + \mu_2\overline{A}_1 + \overline{W}_1 + \overline{W}_2)$
$a_1 = (B^TB + \mu_1 I)^{-1}(B^To_1 + \mu_2 a_{2,1} + w_{2,1})$
$a_T = (B^TB + \mu_1 I)^{-1}(B^To_T + \mu_1 a_{1,T} + w_{1,T})$
$A = [a_1 \, \overline{A} \, a_T]$
$A_1 = (\gamma \Phi^T \Lambda^T \Lambda \Phi + \mu_2 I)^{-1}$
  $\times (\gamma \Phi^T \Lambda^T \Phi A_2 - W_2 + \mu_2 AE_1)$
$A_2 = (\gamma \Phi^T \Phi + \mu_1 I)^{-1} (\gamma \Phi^T \Lambda \Phi A_1 - W_1 + \mu_1 AE_2)$
$W_1 = W_1 + \mu_1(A_1 - AE_1)$
$W_2 = W_2 + \mu_2(A_2 - AE_2)$
$\mu_1 = c\mu_1$, $\mu_2 = c\mu_2$
end for
$A = [a_1 \, \overline{A} \, a_T]$

---

According to an embodiment of the present disclosure, a method for determining a set of time varying flow parameters in an unobserved spatial region of a complete spatial scene. The method including obtaining a set of time varying observed flow parameters from an observed spatial region of the complete spatial scene. Determining an operator that models a dynamical system behavior of the flow of a crowd in the complete spatial scene. Updating a set of complete time varying flow parameters in the complete spatial scene according to the operator that models the dynamical system, by minimizing an error between the set of observed flow parameters and the set of complete flow parameters in the observed spatial region. Outputting the set of complete time varying flow parameters in the unobserved spatial region of the complete spatial scene, wherein at least some steps of the method are performed by a processor.

Method 3

Another method for determining the complete flow parameters is illustrated in the flow diagram of FIG. 3B. This method describes a linear observer design 350 for determining the complete flow parameters 310. The benefit of this approach is that it provides a linear representation of the dynamics due to the Koopman-based change of coordinates, regardless of the original PDE that describes the data.

We find a change of coordinates, that leads to a linear representation of the crowd flow dynamics. Then, based on this linear representation, we design a linear output-feedback based observer for the crowd flow. Consider the system (2), associated with the output $$y(k) = h(x(k)), \, k \geq 0, \quad (12)$$

where, $h: M \to R^m$ is the output mapping, which will play the role of the vector valued observable g, defined in Section 3.

We assume that there exists a finite set of basis functions $\varphi_i$, =1, 2, ..., n, such that x, h(x) can be written as $$x(k) = \sum_{i=1}^{i=n} \varphi_i(x(k))\xi_i^x, \quad h(x(k)) = \sum_{i=1}^{i=n} \varphi_i(x(k))\xi_i^h, \quad (13)$$

where, $\xi_i^x \in C^N$, $\xi_i^h \in C^m$, are the Koopman modes associated with x, and h, respectively. More specifically, the Koopman modes associated with x are the set of complete modes for the states of the flow of the objects at all sample points in the scene. On the other hand, the Koopman modes associated with h are the set of observable modes for the states of the flow of objects at the observed sample points in the scene. We can now define the following change of variables $$\Pi(x) = (\pi_1(x), \pi_n(x))^T, \quad (14)$$

where $\Pi: R^N \to R^n$, is defined as $$\begin{cases} \pi_i(x) = \varphi_i(x), \text{if the ith Koopman function is real,} \\ \pi_i(x) = 2\text{Re}(\varphi_i(x)), \pi_{i+1}(x) = 2\text{Im}(\varphi_i(x)) \text{ if the} \\ \text{ith}/i+1\text{th Koopman functions are complex(conjugate)} \end{cases} \quad (15)$$

Based on this change of coordinates, the system (2), under the Koopman operator representation (13), can be re-written as the linear system $$\begin{cases} \pi(k+1) = A\pi(k), \\ h(x(k)) = C^h \pi(k), \\ x(k) = C^x \pi(k), \end{cases} \quad (16)$$

where, the system matrices of complete modes, observable modes, and eigenvalues 360 are defines as follows $$\begin{cases} \pi_i(k+1) = \lambda_i \pi_i(k), \text{if the ith Koopman function is real,} \\ \pi_i(k+1) = |\lambda_i|(c(\theta_i)\pi_i(k) + s(\theta_i)\pi_{i+1}(k)), \text{ and,} \\ \pi_{i+1}(k+1) = |\lambda_i|(-s(\theta_i)\pi_i(k) + c(\theta_i)\pi_{i+1}(k)) \text{ if the} \\ \text{ith}/i+1\text{th Koopman functions are complex(conjugate),} \end{cases} \quad (17)$$

where, $\theta_i = \arg(\lambda_i)$, $c(.) = \cos(.)$, and $s(.) = \sin(.)$.
The columns of $C^x$, are defined as $$\begin{cases} C^x(:, i) = \xi_i^x, \text{if the ith Koopman function is real,} \\ C^x(:, i) = \text{Re}\{\xi_i^x\}, C^x(:, i+1) = \text{Im}\{\xi_i^x\}, \text{if the} \\ \text{ith}/i+1\text{th Koopman functions are complex(conjugate).} \end{cases} \quad (18)$$

The columns of $C^h$, are defined as $$\begin{cases} C^h(:, i) = \xi_i^x, \text{if the ith Koopman function is real,} \\ C^h(:, i) = \text{Re}\{\xi_i^h\}, C^h(:, i+1) = \text{Im}\{\xi_i^h\}, \text{if the} \\ \text{ith}/i+1\text{th Koopman functions are complex(conjugate).} \end{cases} \quad (19)$$

Now that we have defined the change of coordinates, leading to the linear form (16), (17), (18), and (19), we can write an output feedback-based linear observer, of the luenberger form $$\begin{cases} \hat{\pi}(k+1) = A\hat{\pi}(k) + K(y(k) - \hat{y}(k)), \\ \hat{y}(k) = C^h \hat{\pi}(k), \end{cases} \quad (20)$$

where, K is a stabilizing feedback gain 370 which is properly selected to ensure the convergence of the observer. To compute the stabilizing matrix K, we use a discreet pole placements, to place the poles of the closed-loop observer error dynamics $\pi(k+1) - \hat{\pi}+1) = e(k+1) = (A - KC^h)e(k)$, inside of the unitary circle. After the convergence of the observer, one can compute an estimate $\hat{x}$ of the full state x by the simple algebraic mapping $$\hat{x}(k) = C^x \hat{\pi}(k). \quad (21)$$

As we mentioned earlier, the choice of K is important to guaranty the convergence of the observer (20). The existence of a stabilizing gain matrix K is contingent to the assumption that the system (16) is observable. One way to check for the observability of linear time invariant systems, is the following rank condition: The system (16) is observable if rank$(O(A, C^h)) = n$, where $O(A, C^h)$ is the observability matrix, defined as $$O = \begin{bmatrix} C^h \\ C^h A \\ \vdots \\ C^h A^{n-1} \end{bmatrix}.$$

Figure 4:
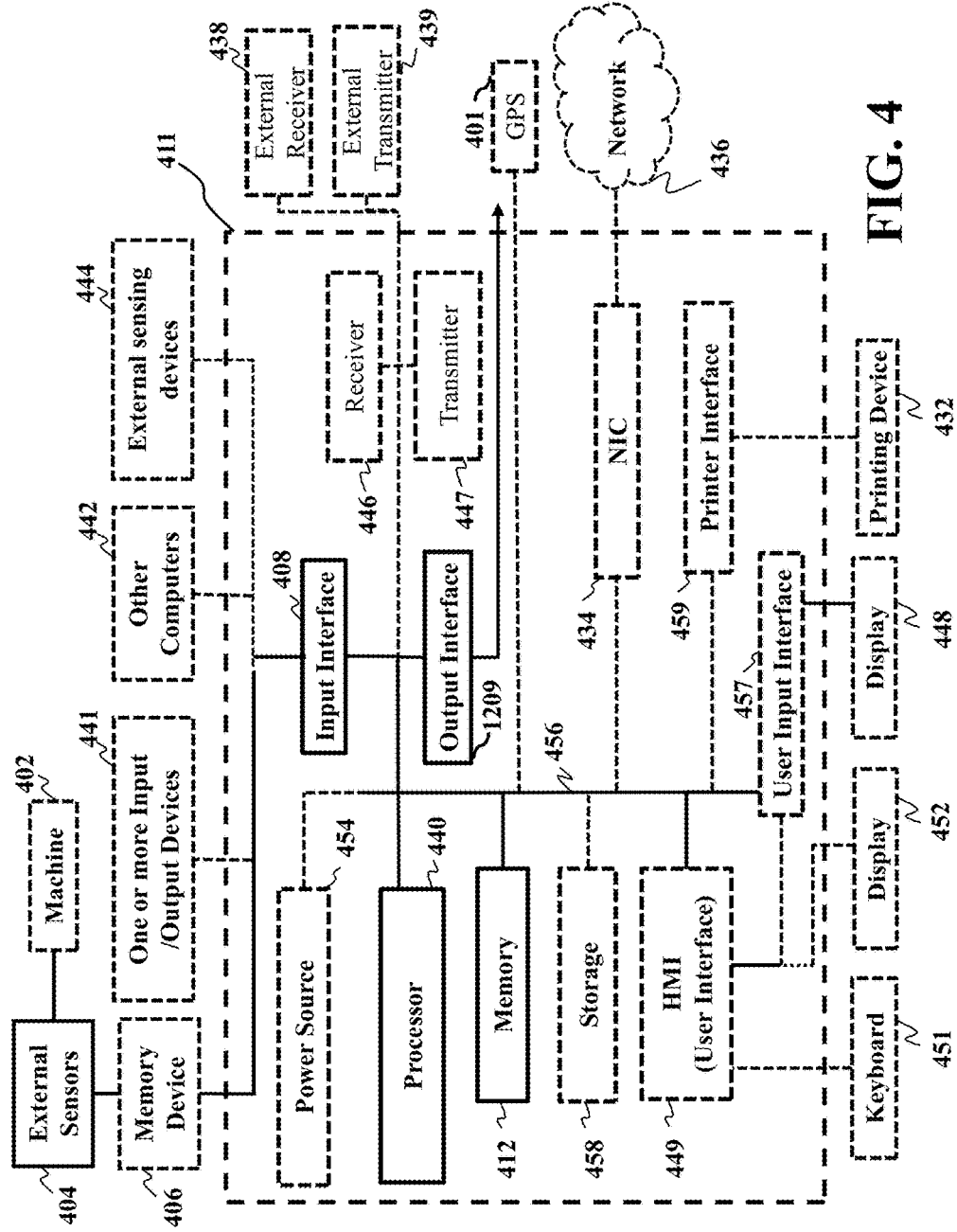
FIG. 4 is a block diagram of illustrating the method of FIG. 1A, that can be implemented using an alternate computer or processor, according to embodiments of the present disclosure.

FIG. 4 is a block diagram of illustrating the method of FIG. 1A, that can be implemented using an alternate computer or processor, according to embodiments of the present disclosure. The computer 411 includes a processor 440, computer readable memory 412, storage 458 and user interface 449 with display 452 and keyboard 451, which are connected through bus 456. For example, the user interface 449 in communication with the processor 440 and the computer readable memory 412, acquires and stores the measuring data in the computer readable memory 412 upon receiving an input from a surface, keyboard surface, of the user interface 457 by a user.

Contemplated is that the memory 412 can store instructions that are executable by the processor, historical data, and any data to that can be utilized by the methods and systems of the present disclosure. The processor 440 can be a single core processor, a multi-core processor, a computing cluster, or any number of other configurations. The processor 440 can be connected through a bus 456 to one or more input and output devices. The memory 412 can include random access memory (RAM), read only memory (ROM), flash memory, or any other suitable memory systems.

Still referring to FIG. 4, a storage device 458 can be adapted to store supplementary data and/or software modules used by the processor. For example, the storage device 458 can store historical device data and other related device data such as manuals for the devices, wherein the devices are sensing device capable of obtaining measured data as mentioned above regarding the present disclosure. Additionally, or alternatively, the storage device 458 can store historical data similar to the measuring data. The storage device 458 can include a hard drive, an optical drive, a thumb-drive, an array of drives, or any combinations thereof.

The system can be linked through the bus 456 optionally to a display interface (not shown) adapted to connect the system to a display device (not shown), wherein the display device can include a computer monitor, camera, television, projector, or mobile device, among others.

The computer 411 can include a power source 454, depending upon the application the power source 454 may be optionally located outside of the computer 411. Linked through bus 456 can be a user input interface 457 adapted to connect to a display device 448, wherein the display device 448 can include a computer monitor, camera, television, projector, or mobile device, among others. A printer interface 459 can also be connected through bus 456 and adapted to connect to a printing device 432, wherein the printing device 432 can include a liquid inkjet printer, solid ink printer, large-scale commercial printer, thermal printer, UV printer, or dye-sublimation printer, among others. A network interface controller (NIC) 434 is adapted to connect through the bus 456 to a network 436, wherein measuring data or other data, among other things, can be rendered on a third party display device, third party imaging device, and/or third party printing device outside of the computer 411.

Still referring to FIG. 4, the measuring data or other data, among other things, can be transmitted over a communication channel of the network 436, and/or stored within the storage system 458 for storage and/or further processing. Further, the measuring data or other data may be received wirelessly or hard wired from a receiver 446 (or external receiver 438) or transmitted via a transmitter 447 (or external transmitter 439) wirelessly or hard wired, the receiver 446 and transmitter 447 are both connected through the bus 456. The computer 411 may be connected via an input interface 408 to external sensing devices 444 and external input/output devices 441. The computer 411 may be connected to other external computers 442. An output interface 409 may be used to output the processed data from the processor 440.

The above-described embodiments of the present disclosure can be implemented in any of numerous ways. For example, the embodiments may be implemented using hardware, software or a combination thereof. Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A system for determining states of flow of objects in a scene, wherein the objects include one or a combination of an animal, a machine, a fluid, a material or an electrical current, the system comprising:

at least one sensor to measure the states of the flow at observed sample points of the scene, wherein the scene contains a set of sample points having subsets of observed and unobserved sample points;

a memory to store historical training data including flow of objects in the scene and a non-parametric operator specifying time-varying dynamics of training states of flow of the objects in the scene, wherein the non-parametric operator includes a set of operator eigenvalues and a set of operator modes that determine a set of complete modes for the states of the flow of the objects at all sample points in the set of sample points of the scene, and wherein the non-parametric operator is trained to determine an estimated future state of the states of flow of the objects at a sample point in the scene, as a function of current measured states of the states of flow of the objects at the set of sample points in the scene;

an input interface in communication with the at least one sensor, to acquire the current measured states of the flow of the objects at the observed sample points of the scene;

a processor in communication with the memory and the input interface, configured to estimate, using the non-parametric operator and the current measured states at the subset of observed sample points along with the states of the flow of the objects at the subset of unobserved sample points of the scene, the estimated future states at the subset of observed sample points and at the subset of unobserved sample points, to ascertain that the estimated future states at the subset of observed sample points are consistent with the measured states at the subset of observed sample points; and an output interface in communication with the processor, configured for outputting the states of the flow at the set of unobserved sample points of the scene, so as to assist in a management of managing states of flow of objects in the scene.

2. The system of claim 1, wherein the training of the non-parametric operator includes one or a combination of:

obtaining historical data of training states of the flow of objects in the set of sample points in the scene;

simulating according to a model, the training states of the flow of objects in the set of sample points in the scene; or obtaining the training states of the flow of objects in a series of subsets of sample points in the scene, wherein at least one subset of the sample points in the series of subsets of sample points, are observed sample points at a time that is different than observable sample points times for the remaining subsets of the sample points in the series of subsets of sample points in the scene, such that all the subsets of the sample points in the series of sample points in the scene include all the sample points in the set of sample points in the scene.

3. The system of claim 1, wherein the states of flow of the object includes one or a combination of a density, a velocity, temperature or a flowrate.

4. The system of claim 1, wherein the states of flow of the object includes one or a combination of an electrical current, a voltage, a power or a load.

5. The system of claim 1, wherein the non-parametric operator is a data dependent operator that directly estimates the states of the flow without requiring parameters to represent motion, such as physical quantities or space.

6. The system of claim 1, wherein the estimating of the states of the flow of the objects at the subset of unobserved sample points of the scene includes:
   determining a set of coefficients for a set of basis matrices by minimizing an error between the set of observed sample points of the scene by the sensors and the estimated future states at the subset of observed sample points of the non-parametric operator; and
   confirming that the set of coefficients for the set of basis matrices conform to a temporal prediction condition according to a set of eigenvalues of the non-parametric operator.

7. The system of claim 6, further comprising:
   minimizing an error between subsets of coefficients of the set of coefficients for the set of basis matrices that are associated with correlating the set of observed sample points of the scene by the sensors and the estimated states at the subset of observed sample points of the non-parametric operator.

8. The system of claim 1, wherein the estimating of the states of the flow of the objects at the subset of unobserved sample points of the scene includes:
   determining a dynamical system, wherein the dynamical system includes an observer, such the observer includes an observer model.

9. The system of claim 1, wherein the estimating of the states of the flow of the objects at the subset of unobserved sample points of the scene is according to the observer model, and includes:
   determining, based on the set of operator modes of the non-parametric operator, a set of complete modes for the states of the flow of the objects at all sample points in the set of sample points of the scene;
   determining a subset of observable modes of the set of operator modes for the states of the flow of the objects at the subset of the observed sample points of the scene;
   determining a stabilizing feedback gain for an observer model of the flow of the objects at the subset of the observed sample points of the scene by assigning pole eigenvalues of the feedback gain inside a complex unit circle;
   estimating a set of basis functions by confirming that the multiplication of the set of basis functions with the set of the observable modes conform to a temporal prediction condition according to the set of eigenvalues of the non-parametric operator;
   generating the states of flow of the objects at the subset of the unobserved sample points by multiplying the set of complete modes by the set of basis functions; and
   outputting the states of the flow at the set of unobserved sample points of the scene.

10. The system of claim 1, wherein the at least one sensor is a camera capturing video of the flows of objects, and the flow of objects are pedestrians in the scene, such that the video includes a set of frames, such that the flows are independent pedestrian flows obtained from each frame in the set of frames in the subset of the observed sample points of the scene, and the subset of the observed sample points of the scene are selected from a group consisting of a set of velocity vectors, a set of crowd densities, a set of optical flow vectors or a set of motion vectors.

11. The system of claim 1, wherein the non-parametric operator specifying time-varying dynamics of training states of flow of the objects at the set of sample points in the scene is selected from a group consisting of a Koopman operator, a dynamic mode decomposition operator, an extended dynamic mode decomposition operator and a kernel dynamic mode decomposition operator.

12. The system of claim 1, wherein the measured states at the subset of observed sample points include noise observations, such that the estimated future states at the subset of observed sample points are consistent or equal to the measured states less the noise observations at the subset of observed sample points.

13. A method for determining states of flow of objects in a scene, wherein the objects include one or a combination of an animal, a machine, a fluid, a material or an electrical current, the method comprising:
   acquiring measured states of the flow at observed sample points of the scene generated by at least one sensor, wherein the scene contains a set of sample points having subsets of observed and unobserved sample points;
   using a memory having stored historical training data including flow of objects in the scene and a non-parametric operator specifying time-varying dynamics of training states of flow of the objects in the scene, wherein the non-parametric operator includes a set of operator eigenvalues and a set of operator modes that determine a set of complete modes for the states of the flow of the objects at all sample points in the set of sample points of the scene, and wherein the non-parametric operator is trained to determine an estimated future state of the states of flow of the objects at a sample point in the scene, as a function of current measured states of the states of flow of the objects at the set of sample points in the scene;
   acquiring the current measured states of the flow of the objects at the observed sample points of the scene via an input interface in communication with the at least one sensor;
   estimating, by a processor in communication with the memory and the input interface, and using the non-parametric operator and the current measured states at the subset of observed sample points along with the states of the flow of the objects at the subset of unobserved sample points of the scene, the estimated future states at the subset of observed sample points and at the subset of unobserved sample points, to ascertain that the estimated future states at the subset of observed sample points are consistent with the measured states at the subset of observed sample points; and
   outputting, via an output interface in communication with the processor, the states of the flow at the set of unobserved sample points of the scene, so as to assist in a management of managing states of flow of objects in the scene.

14. The method of claim 13, wherein the training of the non-parametric operator includes one or a combination of:
   obtaining historical data of training states of the flow of objects in the set of sample points in the scene;
   simulating according to a model, the training states of the flow of objects in the set of sample points in the scene; or
   obtaining the training states of the flow of objects in a series of subsets of sample points in the scene,
      wherein at least one subset of the sample points in the series of subsets of sample points, are observed sample points at a time that is different than observable sample points times for the remaining subsets of the sample points in the series of subsets of sample points in the scene, such that all the subsets of the sample points in the series of sample points in the scene include all the sample points in the set of sample points in the scene.

15. The method of claim 13, wherein the estimating of the states of the flow of the objects at the subset of unobserved sample points of the scene includes:
determining a set of coefficients for a set of basis matrices by minimizing an error between the set of observed sample points of the scene by the sensors and the estimated future states at the subset of observed sample points of the non-parametric operator;
confirming that the set of coefficients for the set of basis matrices conform to a temporal prediction condition according to a set of eigenvalues of the non-parametric operator; and
minimizing an error between subsets of coefficients of the set of coefficients for the set of basis matrices that are associated with correlating the set of observed sample points of the scene by the sensors and the estimated states at the subset of observed sample points of the non-parametric operator.

16. A non-transitory computer readable storage medium embodied thereon a program executable by a computer for performing a method, the method for determining states of flow of objects in a scene, wherein the objects include one or a combination of an animal, a machine, a fluid, a material or an electrical current, the method comprising:
acquiring measured states of the flow at observed sample points of the scene generated by at least one sensor, wherein the scene contains a set of sample points having subsets of observed and unobserved sample points;
using a memory having stored historical training data including flow of objects in the scene and a non-parametric operator specifying time-varying dynamics of training states of flow of the objects in the scene, wherein the non-parametric operator includes a set of operator eigenvalues and a set of operator modes that determine a set of complete modes for the states of the flow of the objects at all sample points in the set of sample points of the scene, and wherein the non-parametric operator is trained to determine an estimated future state of the states of flow of the objects at a sample point in the scene, as a function of current measured states of the states of flow of the objects at the set of sample points in the scene, wherein the non-parametric operator is a data dependent operator that directly estimates the states of the flow without requiring parameters to represent motion;
acquiring the current measured states of the flow of the objects at the observed sample points of the scene via an input interface in communication with the at least one sensor;
estimating, by a processor in communication with the memory and the input interface, and using the non-parametric operator and the current measured states at the subset of observed sample points along with the states of the flow of the objects at the subset of unobserved sample points of the scene, the estimated future states at the subset of observed sample points and at the subset of unobserved sample points, to ascertain that the estimated future states at the subset of observed sample points are consistent with the measured states at the subset of observed sample points; and
outputting, via an output interface in communication with the processor, the states of the flow at the set of unobserved sample points of the scene, so as to assist in a management of managing states of flow of objects in the scene.

17. The method of claim 16, wherein the training of the non-parametric operator includes one or a combination of:
obtaining historical data of training states of the flow of objects in the set of sample points in the scene;
simulating according to a model, the training states of the flow of objects in the set of sample points in the scene; or
obtaining the training states of the flow of objects in a series of subsets of sample points in the scene,
wherein at least one subset of the sample points in the series of subsets of sample points, are observed sample points at a time that is different than observable sample points times for the remaining subsets of the sample points in the series of subsets of sample points in the scene, such that all the subsets of the sample points in the series of sample points in the scene include all the sample points in the set of sample points in the scene.

18. The method of claim 16, wherein estimating of the states of the flow of the objects at the subset of unobserved sample points of the scene includes:
determining a dynamical system, wherein the dynamical system includes an observer, wherein the observer includes an observer model, such that the non-parametric operator includes the set of operator modes and the set of eigenvalues;
estimating of the states of the flow of the objects at the subset of unobserved sample points of the scene is according to the observer model, and includes:
determining, based on the set of operator modes of the non-parametric operator, a set of complete modes for the states of the flow of the objects at all sample points in the set of sample points of the scene;
determining a subset of observable modes of the set of operator modes for the states of the flow of the objects at the subset of the observed sample points of the scene;
determining a stabilizing feedback gain for an observer model of the flow of the objects at the subset of the observed sample points of the scene by assigning pole eigenvalues of the feedback gain inside a complex unit circle;
estimating a set of basis functions by confirming that the multiplication of the set of basis functions with the set of the observable modes conform to a temporal prediction condition according to the set of eigenvalues of the non-parametric operator;
generating the states of flow of the objects at the subset of the unobserved sample points by multiplying the set of complete modes by the set of basis functions; and
outputting the states of the flow at the set of unobserved sample points of the scene.

* * * * *